(12) United States Patent
Vishkin

(10) Patent No.: US 7,505,822 B2
(45) Date of Patent: Mar. 17, 2009

(54) OPTICAL INTERCONNECT STRUCTURE IN A COMPUTER SYSTEM AND METHOD OF TRANSPORTING DATA BETWEEN PROCESSING ELEMENTS AND MEMORY THROUGH THE OPTICAL INTERCONNECT STRUCTURE

(75) Inventor: Uzi Vishkin, Potomac, MD (US)

(73) Assignee: University of Maryland, College Park, MD (US)

( * ) Notice: Subject to any disclaimer, the term of this patent is extended or adjusted under 35 U.S.C. 154(b) by 635 days.

(21) Appl. No.: 10/529,310

(22) PCT Filed: Mar. 17, 2004

(86) PCT No.: PCT/US2004/005239

§ 371 (c)(1),
(2), (4) Date: Mar. 25, 2005

(87) PCT Pub. No.: WO2004/083904

PCT Pub. Date: Sep. 30, 2004

(65) Prior Publication Data

US 2006/0051101 A1 Mar. 9, 2006

Related U.S. Application Data

(60) Provisional application No. 60/455,654, filed on Mar. 18, 2003.

(51) Int. Cl.
*G06F 19/00* (2006.01)
(52) U.S. Cl. .......................... 700/90; 326/47
(58) Field of Classification Search ............... 700/1, 700/90; 385/129, 130, 144, 94; 710/13, 710/105, 300, 301; 711/154, 170; 326/47
See application file for complete search history.

(56) References Cited

U.S. PATENT DOCUMENTS 4,564,900 A * 1/1986 Smitt ..................... 709/212

(Continued)

OTHER PUBLICATIONS

Sasak et al., An Optical Active connector: An Optical Interconnect Module with an Electrical connector Interface, 1996, Electronic Components and Technology Conference, IEEE, pp. 512-519.*

(Continued)

*Primary Examiner*—Kidest Bahta
(74) *Attorney, Agent, or Firm*—Rosenberg, Klein & Lee

(57) ABSTRACT

A multi-chip processor/memory arrangement replacing a large computer chip, includes a number of modules each including processing elements, registers, and/or memories interconnected by an optical interconnection fabric providing an all-to-all interconnection between the chips, so that the memory cells on each chip represent a portion of shared memory. The optical interconnect fabric is responsible for transporting data between the chips while processing elements on each chip dominate processing. Each chip is manufactured in mass production so that the entire processor/memory arrangement is fabricated in an inexpensive and simplified technology process. The optical communication fabric is based on waveguide technology and includes a number of waveguides, the layout of which follows certain constraints. The waveguides can intersect each other in the single plane, or alternatively, a double layer of waveguide structures and bent over approach may be used. Specific layout patterns of the optical waveguides are presented. The communication of data along the optical communication channels is performed in highly pipelined decentralized routing manner and is envisioned for XMT architecture application.

47 Claims, 11 Drawing Sheets

U.S. PATENT DOCUMENTS

| | | | |
|---|---|---|---|
| 4,700,325 A | | 10/1987 | Ware |
| 4,922,415 A | | 5/1990 | Hemdel |
| 5,548,772 A | * | 8/1996 | Lin et al. .................... 398/164 |
| 5,781,465 A | | 7/1998 | Lutz et al. |
| 5,797,043 A | * | 8/1998 | Lewis et al. ................... 710/56 |
| 5,815,656 A | * | 9/1998 | Candelaria et al. ............ 714/54 |
| 6,311,296 B1 | * | 10/2001 | Congdon .................... 714/56 |
| 6,542,918 B1 | | 4/2003 | Viskin |
| 6,567,963 B1 | * | 5/2003 | Trezza ........................... 716/8 |
| 6,848,841 B2 | * | 2/2005 | Cochran et al. ............... 385/88 |
| 7,006,746 B2 | * | 2/2006 | Blalock et al. .............. 385/131 |
| 7,106,611 B2 | * | 9/2006 | Lee et al. ...................... 365/63 |
| 7,359,607 B2 | * | 4/2008 | Blalock et al. .............. 385/129 |

OTHER PUBLICATIONS

Jong et al., Background Memory Managmant for Dynamic Data Structure intensive Processing Systems, 1995, IEEE, pp. 515-519.*

N. Savage, "Linking With Light", IEEE Spectrum, vol. 39, Issue 8, Aug. 2002, pp. 32-36. http://www.usc.edu/dept/engineering/eleceng/Adv_Network_Tech/Html/publications/IEEESpectrum.8.8.02.pdf.

D. Naishlos, et al., "Towards a First Vertical Prototyping of an Extremely Fine-Grained Parallel Programming Approach", Theory of Computer Systems, 36 (2003), 521-552 (Special Issue of SPAA2001) www.cs.umd.edu/projects/cosmic/papers/xmt-spaa01.ps.

U. Vishkin, "Explicit Multi-Threading (XMT): A Pram-On-Chip Vision", http://www.umiacs.umd.edu/users/vishkin/XMT/.

* cited by examiner

OPTICAL INTERCONNECT STRUCTURE IN A COMPUTER SYSTEM AND METHOD OF TRANSPORTING DATA BETWEEN PROCESSING ELEMENTS AND MEMORY THROUGH THE OPTICAL INTERCONNECT STRUCTURE

REFERENCE TO RELATED APPLICATIONS

This Utility Patent Application is based on Provisional Patent Application No. 60/455,654, filed 18 Mar. 2003.

FIELD OF THE INVENTION

The present invention relates to data communication within computer systems. In particular, this invention is directed to an optical interconnect structure for transporting data between processing elements and memory.

In overall concept, the present invention relates to a processor/memory arrangement implemented as a plurality of small chips, each comprising one or more processing elements and/or memory. The chips are interconnected therebetween in all-to-all manner by an optical interconnect fabric. The optical interconnect fabric includes a plurality of optical communication channels interconnecting processing elements and memory elements distributed over a plurality of chips into a processor/memory structure where the data is processed on the chips. The data is transported over the optical interconnect fabric in optical form to a destination chip(s). In the processor/memory arrangement, the memories on the chips can be organized through partitioning of the memory of the computer system. The partition of the memory extends to all levels of the memory hierarchy.

The present invention is further related to an optical interconnect positioned deep inside computer systems, e.g., between the processing elements and the first level of the memory hierarchy in an interchip communication. The processing elements and memory cells of first level caches are positioned on a plurality of smaller chips which are generally less expensive than the VLSI based large computer chip.

The present invention is also directed to an optical interconnection structure with low crosstalk between the optical communication channels based on optical waveguide technology in which waveguides extend and cross each other in a single plane and where the optical waveguides can be bent over others in a double-plane implementation.

Furthermore, the present invention relates to a highly pipelined optical interconnect which permits high speed communication between parallel processing elements and memory modules (e.g., first level cache) based on a de-centralized routing scheme, with relatively fewer synchronization requirements, in a conflict-free fashion.

BACKGROUND OF THE INVENTION

Optical interconnect systems internal to computers are receiving increasing attention as presented for example in Nail Savage, "Linking With Light", IEEE Spectrum, August 2002, Pages 32-36. This Paper hypothesizes that within a few years many of the copper connections in computers will yield to high speed optical interconnect where photons rather than electrons, will pass signals from board to board, or chip to chip, or even from one part of the chip to another. In these computer systems, an electrical signal from the processor would modulate a miniature laser beam which would travel through air or a waveguide to a photodetector. This in turn would pass the signal to the electronics. Assuming that processing elements will continue to mostly be electronics-based, the closer the optical interconnect is to the processing elements, the more challenging the introduction of optics as a means for communication therebetween becomes due to the need to operate at high speeds along with the resulting power requirements.

Modern computer design fabricates processing elements and the highest level of the memory hierarchy (e.g., first level cache) on the same large computer chip which is manufactured by Very Large Scale Integration (VLSI) technology. FIG. 1 shows schematically a processor/cache arrangement implemented on a large computer chip 10 where processing elements 12, such as Control Unit, ALU, FPU (floating point unit), etc., and registers 14, as well as cache memory 16 are fabricated on the large computer chip 10 by means of VLSI technology. A motivation for using recent VLSI technology is to permit larger memories and higher bandwidths interconnect to be included in the large computer chip. Positioning of a plurality of processing and memory modules, as well as an interconnect fabric on a single cutting edge (or next generation) 0.065 micron chip using the VLSI approach, results in high manufacturing costs as well as a rather lengthy and complicated manufacturing process that is associated with an extensive number of photolithographical steps performed on the same large chip.

In parallel computing, although massively parallel processors (MPPs) provide the strongest available machines, recent studies demonstrate that, due to their coarse-grain parallelism, MPPs have not been a success for some general purpose applications and in particular applications have irregular parallelism. Achieving programmable, high performance general-purpose parallel computing has been an objective of the explicit multi-threaded (XMT) fine grained parallel on-chip computer architecture framework. A substantial challenge for an XMT design is to provide connectivity between the many execution units and the many cache modules, on chip.

For these purposes, an all-electronic architecture was outlined in D. Naishlos, J. Nuzman, C-W. Tseng and U. Vishlkin. Towards a First Vertical Prototyping of an Extremely Fine-Grained Parallel Programming Approach. Theory of Computer Systems, 36 (2003), 521-552 (Special Issue of SPAA2001) for building a parallel computer on a chip. In this approach, there are processing elements organized in clusters and memory modules. The computer memory is hierarchical, where, subject to chip capacity limitations, the highest level of the hierarchy (comprising the first-level cache) is on the chip itself. What is relatively unique to XMT is that the processors have no local memories, besides their registers, and the whole memory is shared among all the processors. An important clarification is that the memory is partitioned using a hashing method among the memory modules and the cache coherence problem never occurs since the hashing method designates exactly one physical memory module for each logical memory address. The communication between processor clusters and memory modules is done through an electronic interconnection network.

It is therefore highly desirable to provide an alternative less expensive processor/memory arrangement and replace a single large computer chip approach which would allow an optical interconnection between processing elements and cache memories deep inside the microprocessor module of the computer system.

SUMMARY OF INVENTION

It is an object of the present invention to provide a processor/memory structure which can be implemented based on mass production model which permits inexpensive per unit and a relatively simple manufacturing process and further where the interconnection between the processing elements and cache memories is conducted in optical form.

It is another object of the present invention to provide an optical interconnect deep inside the computer system, i.e., between the elements of the processor and first level cache to transport data in optical form between the processing elements and the memory elements.

It is still an object of the present invention to provide a processor/memory system including processing elements and first level cache where the processing elements and memory cells of the first level cache are distributed over a plurality of chips and wherein the chips are interconnected in an all-to-all fashion by an optical interconnect to transport data between the processing elements and the memory cells.

It is a further object of the present invention to provide an optical interconnect for interconnecting processing elements and memory elements, where the optical interconnect is manufactured as a waveguide with a plurality of waveguide channels capable of crossing in the same plane and further where the optical waveguide channel can bend one over another when needed.

It is still another object of the present invention to provide an arrangement having a plurality of substantially identical inexpensive chips, each of which can be manufactured by for example 0.25 micron technology. In this manner, processing elements and memory cells are formed on each of those chips which are interconnected by an optical interconnect fabric to transport data between these chips in a highly pipelined and decentralized routing regime in order to establish an asynchronous communication between parallel processing elements and first level cache memory in a conflict-free manner.

Further, it is an object of the present invention to provide a method of communicating data between processing elements and memory cells in a computer system where the processing elements and the memory cells are distributed on a plurality of chips. Data is processed on the chips and then transported between chips via optical communication channels formed as a single optical interconnect module.

The present invention also envisages an optical interconnect fabric operating deep inside computer system to provide optical communication between processing elements and memory cells of first level cache. The processing elements and memory cells reside on a plurality of chips, which together in the entirety thereof form the processor/memory arrangement. The data within such a multi-chip processor/memory implementation (as opposed to a single large chip based processor-memory arrangement), is transported by an optical interconnection fabric which includes a plurality of optical communication channels, preferably in the form of optical waveguides on a substrate. Each optical waveguide is coupled between respective pairs of the plurality of chips to form an all-to-all interconnection therebetween to transport data in optical form between the chips. Although other techniques are possible to manufacture such an optical interconnection fabric, it is envisioned that waveguide technology will be used where a plurality of optical waveguides are fabricated capable of extending and crossing in a single plane on the substrate. The design of the optical interconnection fabric should satisfy certain parametric restrictions which include:

(a) the bending of each of the plurality of optical waveguides is limited by a predetermined radius of curvature;

(b) the crossing angle of two optical waveguides intercrossing in a single plane is substantially 90°;

(c) an optical waveguide can bend over another optical waveguide to avoid crossing of the waveguides in a single plane;

(d) not more than two optical waveguides can cross at the same crossing point;

(e) a distance between two crossing points should be above a predetermined value thereof; and (f) a distance between two optical waveguides (beyond the crossing point, if any) cannot be smaller than a predetermined spacing.

In another aspect of the invention, the present invention is directed to a computer system where processor/memory structure is implemented in a multichip arrangement. Each chip includes processing elements and a memory element as well as an optical interconnect structure interconnecting the chips in all-to-all fashion. It is important that these chips can be manufactured in a mass production, where a plurality of chips with a low per unit cost, for example, based on 0.25 micron technology are fabricated in volume production using a single mask as opposed to large computer chip based on expensive VLSI technology, e.g., 0.065 micron technology.

The optical interconnect structure used in the processor/memory arrangement of the present invention forms a pipeline interconnect which permits high speed communication between processing elements, i.e., parallel processing elements, and memory modules, such as, for example, first level cache memory and is based on decentralized, e.g., asynchronous, routing scheme. In their entirety, the memory elements residing on all the chips form shared memory of the computer system.

In the processor/memory arrangement of the present invention the data is processed and/or stored in the processing elements and/or memory cells of the chips and optical interconnect serves specifically to transport the data between chips.

The multi-chip processor/memory structure of the present invention further comprises opto-electronic components each coupled between an end of the optical communication channel and a respective chip in order to convert data from electrical form into optical form at the sending ends of the optical communication channel, and from optical form to electrical form at the receiving ends of optical communication channel. Laser emitting diodes could be used for electrical-to-optical transformation of the data and photodetectors could be used for optical-to-electrical conversion of the data.

Additional storage cells may be provided at both ends of the optical communication channels of the optical interconnect structure to temporarily store therein data to be transported and data that has been transported through the optical communication channel.

In the all-to-all interconnection arrangement of the present invention, receiving ends of a portion of the plurality of the optical communication channels are coupled to the same module. Provisions are made to communicate data in a conflict-free fashion and safely handle the data received at the receiving ends of the optical communication channels for further inputting such data into an input port of a destination chip. For example, a broadcasting unit could broadcast the size of the data to be transmitted to the receiving end of the optical communication channels; in response to such a broadcasting, time slots are issued for data transmission which is sent to the sending end of the optical interconnect to provide a safe data transportation to the same module (chip) in identified time slots.

The present invention further represents a method for communicating data between processing element and memory in a computer system. The method includes the steps of:

distributing the processing elements and the memory cells on a plurality of chips (modules), interconnecting the plurality of chips by an optical interconnect structure having a plurality of optical communication channels coupled between the chips to form an all-to-all interconnection therebetween, outputting processed or stored data in electrical form at an output port of at least one chip, converting the data output at the output port of the chip into optical form thereof, transporting the data in optical form over at least one of the plurality of optical communication channels to at least another of the plurality of chips, converting the transported data into electrical form, and coupling the data in electrical form to an input port of another of the plurality of chips for processing or storing said data therein.

In the method of the present invention, the data is transported over the plurality of optical communication channels in a pipelined regime.

The data transported over a communication channel can be temporarily stored in a storage unit associated with a receiving end of the optical communication channel prior to submitting the data in the receiving chip at the input port thereof.

The further steps include broadcasting (from a sending end of the optical communication channel) a size of data to be transported and issuing from a receiving end of the optical communication channel future time slots for the data transmission. The data is transmitted over the optical communication channels in a decentralized routing regime.

These and other features and advantages of the present invention will be fully understood and appreciated from the following detailed description in conjunction with the accompanying Drawings.

DETAILED DESCRIPTION OF THE PREFERRED EMBODIMENTS

Figure 1:
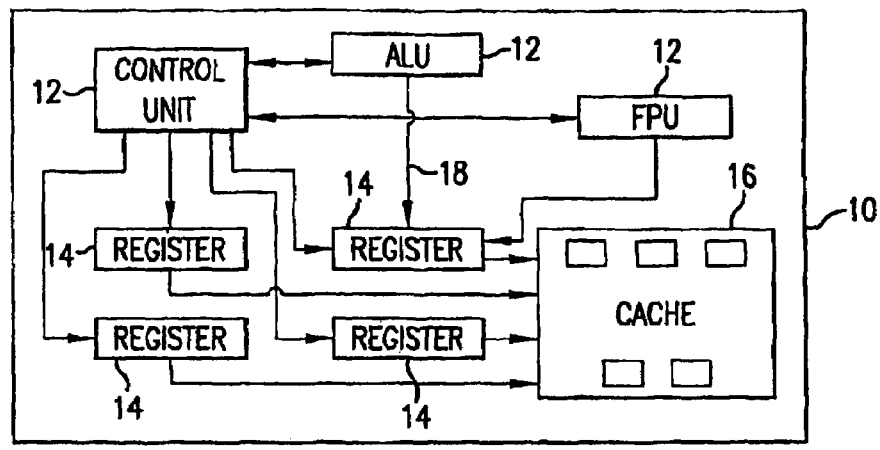
FIG. 1 is a prior art schematic representation of a processor/cache memory arrangement on a large computer chip.
Figure 2:
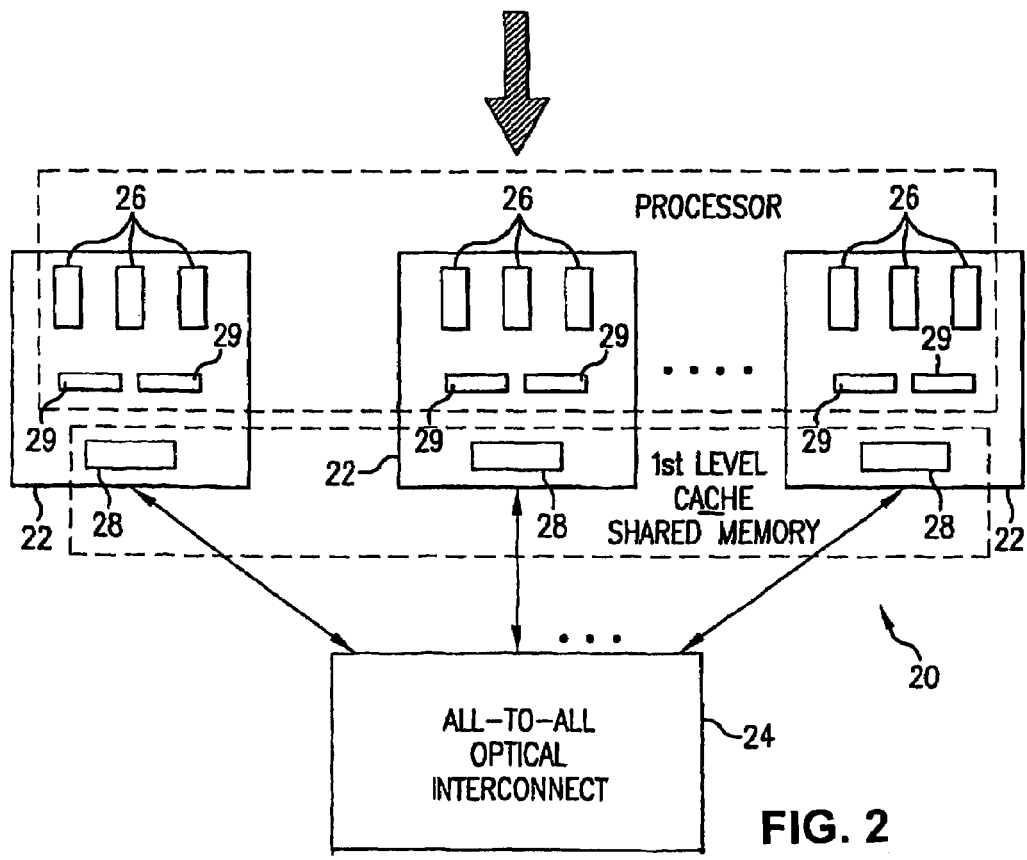
FIG. 2 is a schematic representation of the multi-chip processor/cache memory arrangement of the present invention.
Figure 3A:
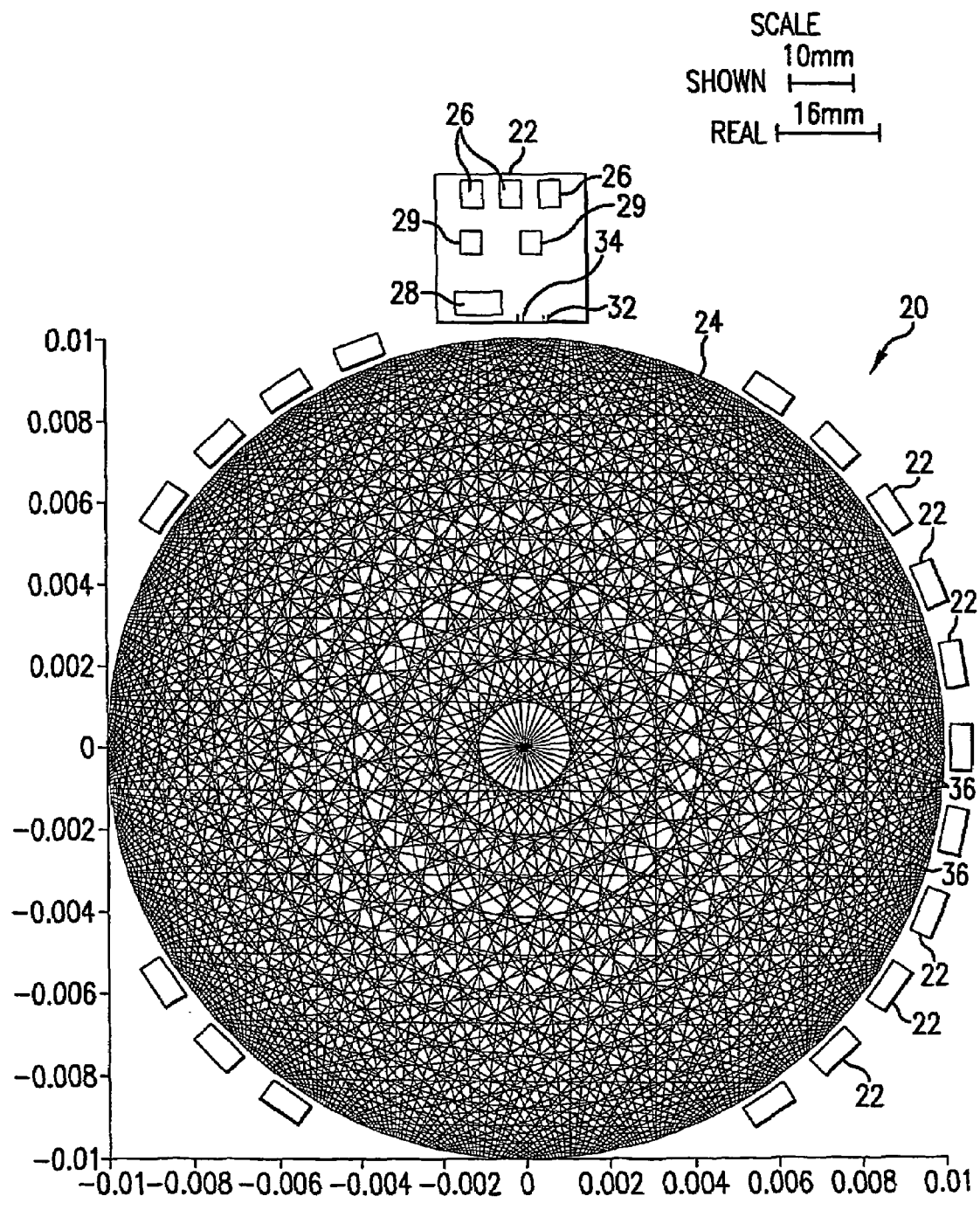
FIG. 3A is a schematic straight line representation of a concept of the multi-chip processor/memory arrangement interconnected by the optical all-to-all interconnect fabric of the present invention.

Referring to FIGS. 2 and 3A, a multi-chip processor/memory arrangement 20 is shown which includes a plurality of modules 22, also referred to herein as chips. The modules 22 are interconnected therebetween by an optical interconnect structure 24 also referred to herein as optical interconnect fabric. The basic concept underlining the structure of the arrangement 20 is to position the processing elements and memory cells on the small chips 22 which are fabricated in mass production based on inexpensive technology, for example, 0.25 micron technology and interconnected with the optical interconnect fabric 24. Packaged with the optical interconnect structure 24, a plurality of inexpensive chips 22 provides sufficient performance but for a small fraction of the cost of the processor/memory arrangement implemented on a single large computer chips (0.065 micron chip).

Each chip 22 may include processing elements' 26, such as for example Control Unit, FPU, ALU, registers 29, etc., and a memory element 28. It has to be understood that the processing elements are not directly connected to a memory element placed on the same chip 22. Also placing processing elements and memory on the same chip 22 is an arbitrary design decision, and is presented herein for example purposes. It is to be understood that other arrangements are possible, such as, for instance, where processing elements and memories are carried by different chips 22. Alternatively, processing elements may be arranged in clusters, e.g., a plurality of processing elements on a single chip 22. A preferred embodiment of the current invention will be based on the principles that in the processor/memory arrangement of the present invention, the processing elements do not have local memories, besides their registers, and the entire memory of the computer system is shared among the processing elements. The entire memory is partitioned using for example, a hashing method which designates one physical memory module for each logical memory address. The communication between processing elements (clusters) and memory elements is through optical interconnect 24. As best shown in FIG. 2, the memory elements 28 of the modules 22 include first level cache and form a shared memory. Each chip 22 has at least one input port 32 and at least one output port 34, as best shown in FIG. 3A.

The novel paradigm for the optical interconnect 24 can serve any level of the memory hierarchy including parallel processing elements and/or the first level of the cache. The optical interconnect structure 24 provides for an all-to-all optical interconnection for the chips 22, and provides interconnection between a plurality, e.g., 16, 32, or 64, etc., of chips carrying processing elements and/or memory elements. Such a processor/memory arrangement, as presented in the present application, allows both improved performance of the computer systems and provide significant cost reduction in comparison with the standard computer system models.

In the processor/memory structure 20 of the present invention, all of the switching (or processing of data) is done in electronics, e.g., the processing elements 26 on the chips 22 while the optical interconnect structure 24 serves exclusively for transporting data between the modules 22.

Figure 3B:
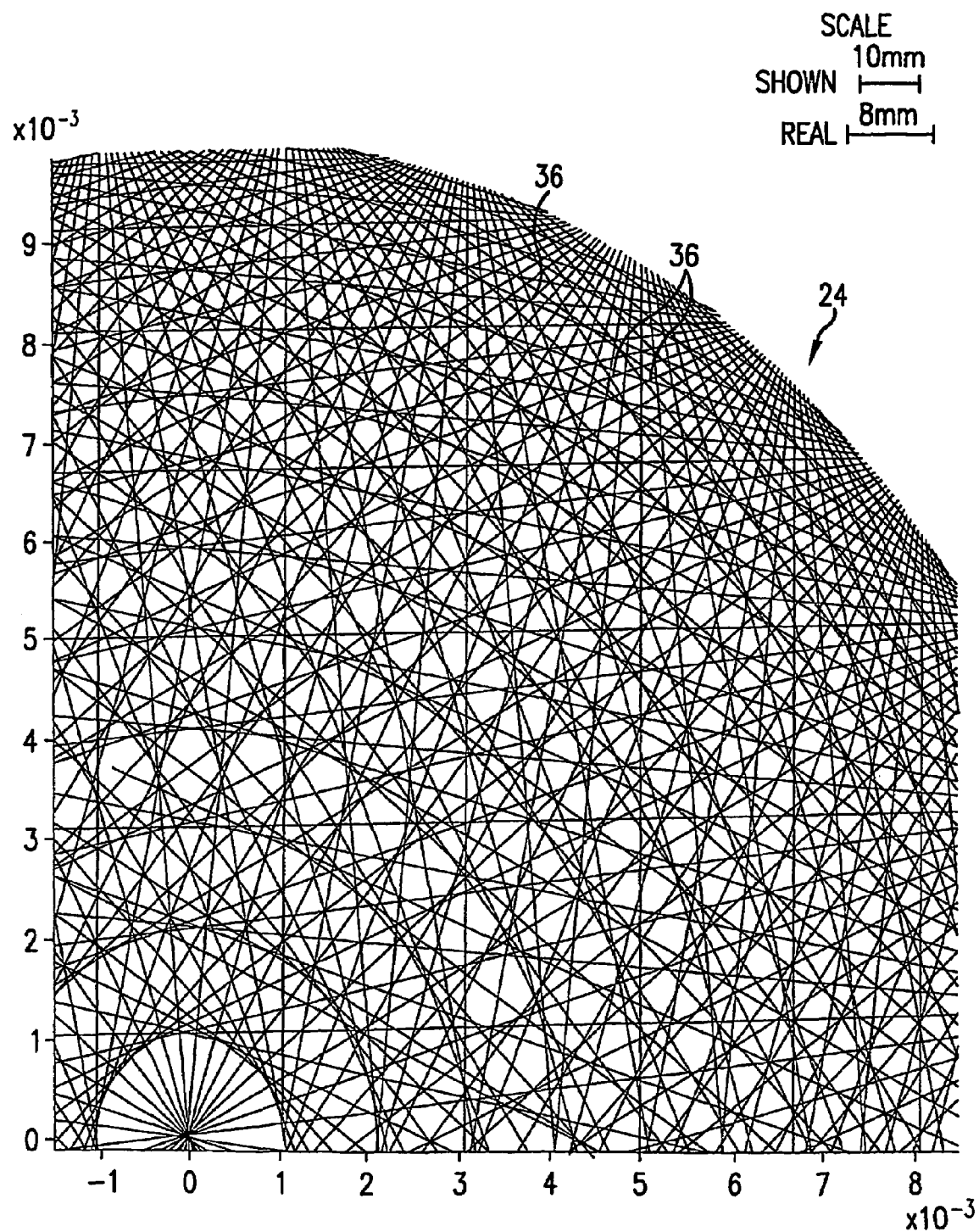
FIGS. 3B-3E depict fractions of FIG. 3A at different scales.
Figure 3C:
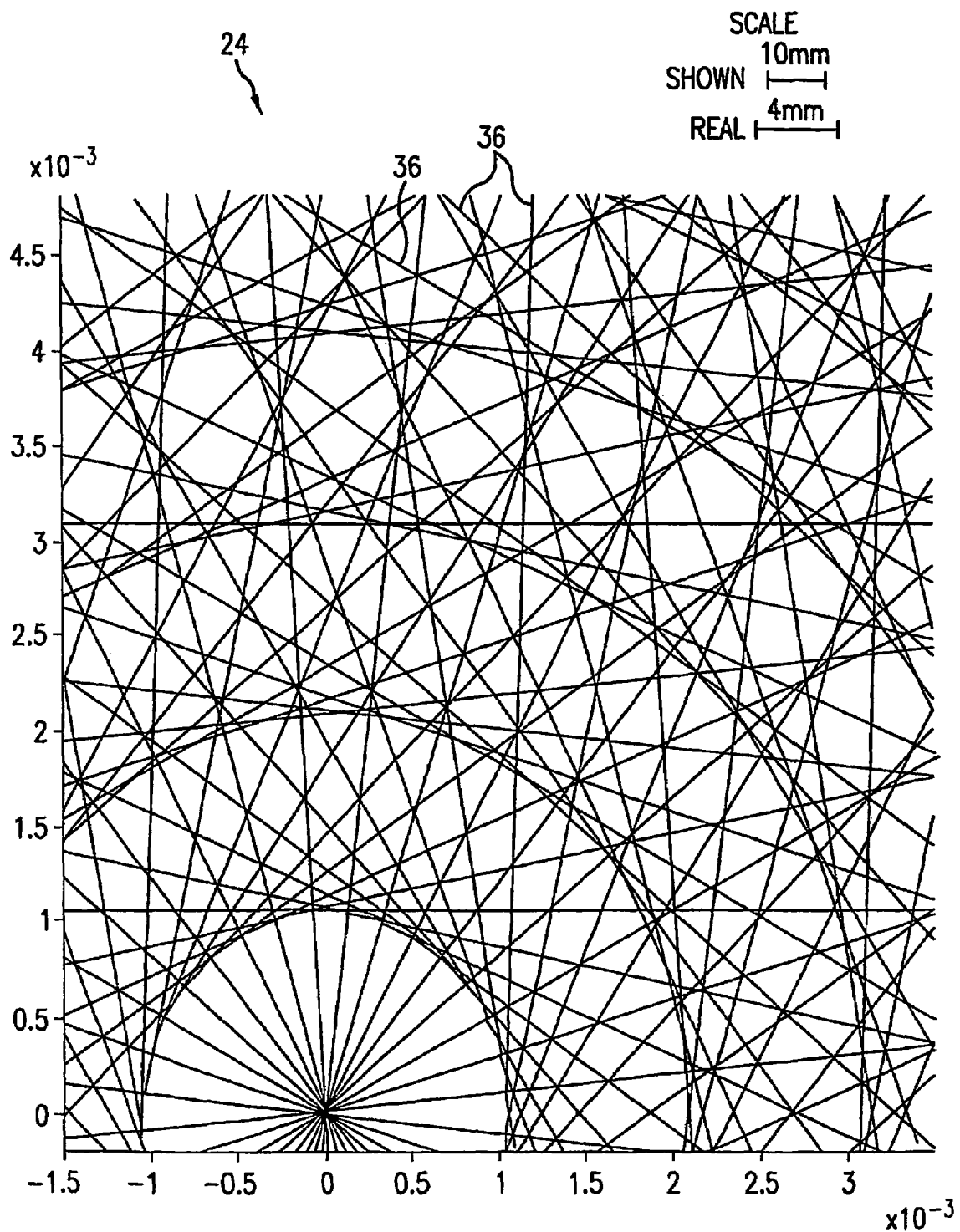
Figure 3D:
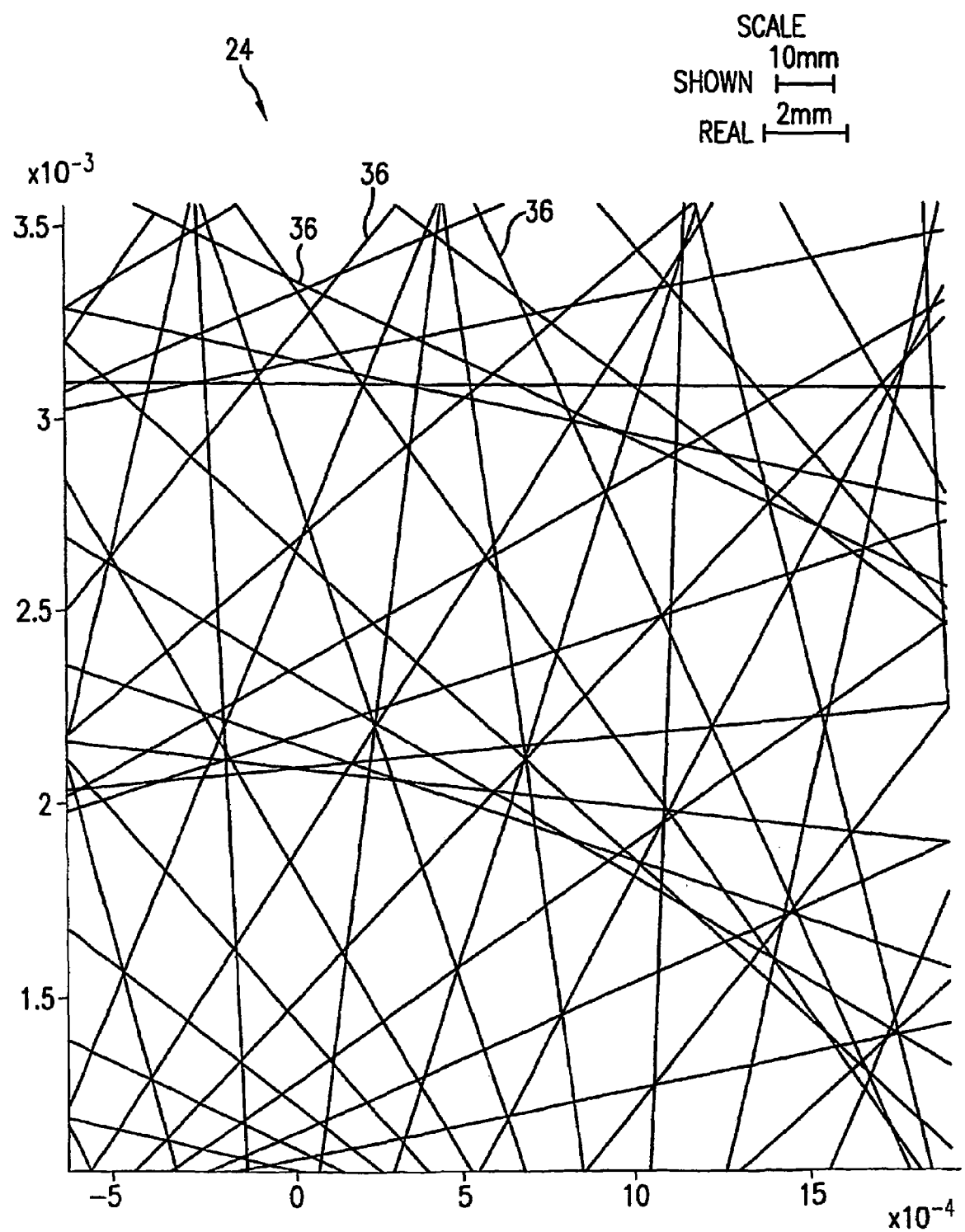
Figure 3E:
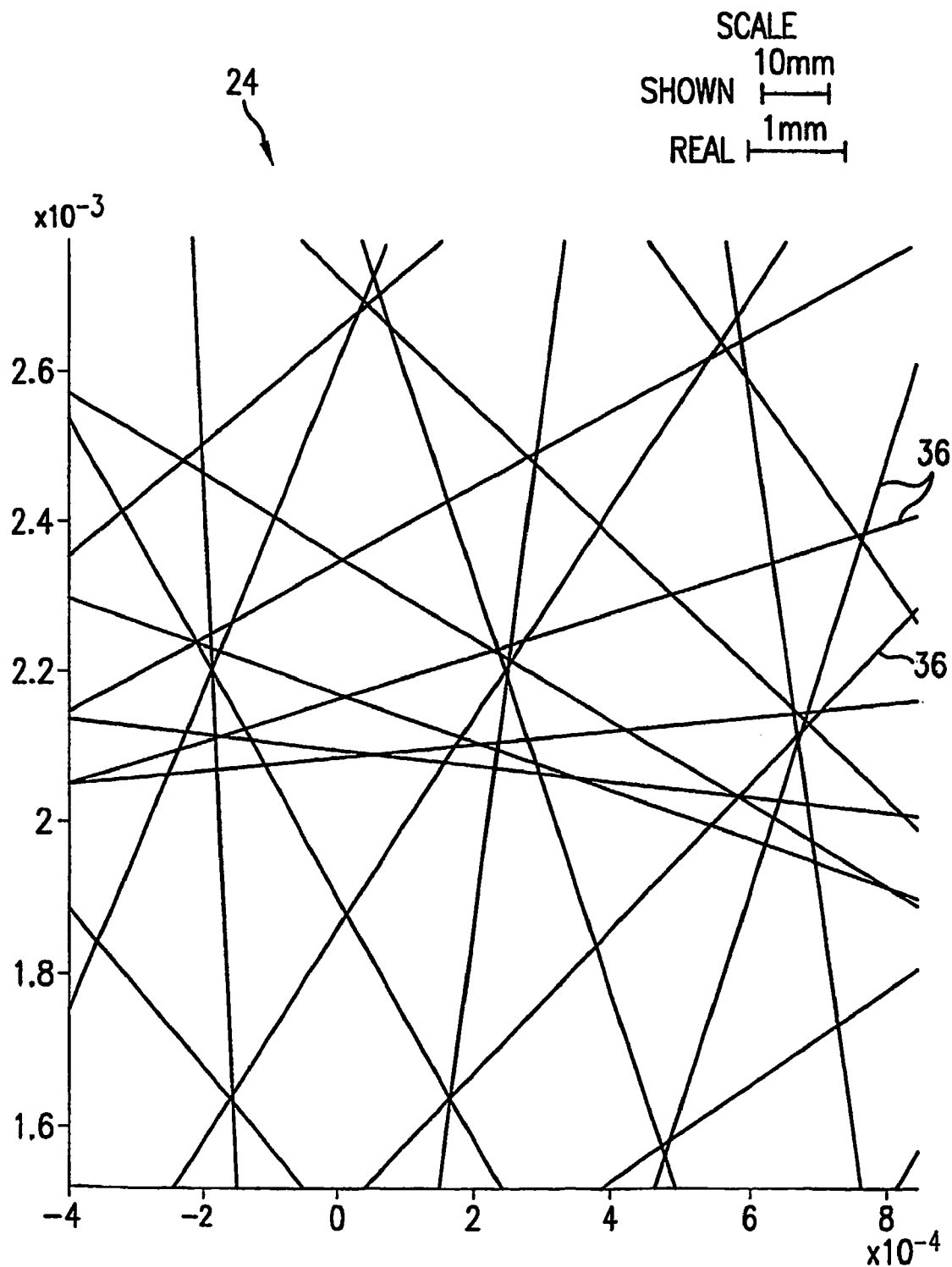
Figure 4:
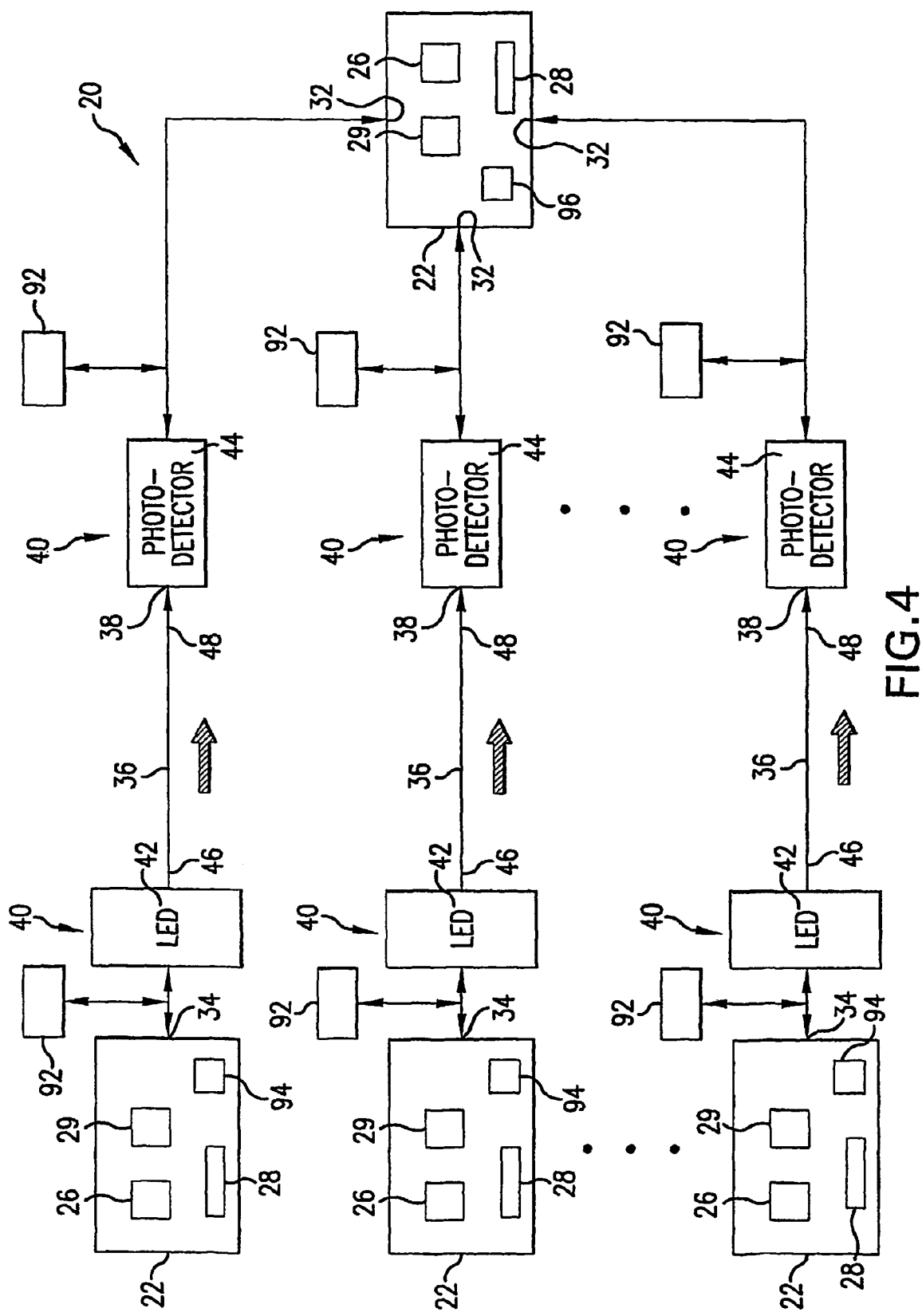
FIG. 4 shows schematically and in a somewhat simplified form a coupling between modules and optical communication channels.

As schematically shown in FIGS. 3A-4, the optical interconnect fabric 24 includes a plurality of optical communication channels 36, with each connected between two respective modules 22 in order that all optical communication channels 36 form an all-to-all interconnection between the modules 22. Each optical communication channel 36 includes a sending end from which the data is transported and a receiving end to which the data is transported via the optical communication channel.

The data processed in the processing elements 26 and/or stored in a memory element 28 of the chip 22 is output at the output port 34 of the chip 22 in electrical form and, as best shown in FIG. 4 is supplied to an input 38 of an optoelectronic component 40. A plurality of components 40 are coupled between the ends of the optical communication channels 36 and respective modules 22. Each optoelectronic component 40 may contain, for example, a light emitting diode 42 and/or photodetector 44 serving for transformation of the signals from electrical form to optical form and vice versa.

For example, as shown in FIG. 4, the optoelectronic component 40 positioned at the sending end 46 of the optical communication channel, includes an LED 42, to which the data is coupled from the output port 34 of the chip 22 in electrical form thereof. The electrical signal corresponding to the output data modulates the optical beam generated by the LED 42. The modulated optical signal is coupled to the sending end 46 of the optical communication channel 36. Transportation is then accomplished to the receiving end 48 of the optical communication channel where a photodetector 44 detects the data in optical form and transforms such data into electrical signals which is input into the input port 32 of the chip 22 for storage in the memory element 28 or for processing by the processing elements 26 residing on the receiving chip 22.

The arrangement of the present invention is particularly promising for explicit multi-threading (XMT) processing which is a framework for parallel computing that provides a high level parallel programming language and encompasses efficient implementation down to a parallel microprocessor architecture. Use of the XMT framework requires an interconnect device capable of providing efficient communication between the parallel processing units and shared memory. The optical interconnect structure 24 of the present invention provides the decision for such a problem by using a decentralized routing scheme, thus allowing asynchronous or loosely synchronous computer system.

The processor/memory structure of the present invention with the optical interconnect between processing elements and memory elements can potentially overcome the limitations of the synchronous computer systems by performing processing and switching on separated chips 22. This avoids global communication and coordination while enabling efficient utilization of the connectivity between the processing elements 26 and the memory elements 28. The high degree of pipelining of the optical interconnect structure 24 enables high bandwidth by allowing transportation of data in several optical communication channels at once. Use of optical principles for transporting data allows for the speed of stage to stage data transfers and reducing the driver size. Furthermore, an asynchronously clocked interconnect 24 allows for all processing elements 26 to be independently clocked. This eliminates the need for a global clock tree and permits processing elements to be separately clocked.

As presented supra, and with reference to FIGS. 3A-5B, the optical interconnection structure 24 includes a plurality of optical communication channels 36 interconnected between respective chips 22 to provide an all-to-all geometric interconnect among a plurality of modules 22. As can be seen in FIG. 3A, illustrating a simplified approximation of the optic interconnect, each module 22 is connected by for instance 31 optical communication channels 36 to 31 modules. Given a plurality of modules, each comprising processing and memory elements, the interconnect 24 provides a system of optical communication channels between every module and every other module. It is envisioned that the optical interconnect may be implemented based on waveguide technology with a plurality of waveguide channels extending on a substrate in one plane or double plane arrangements. However, other fabrication technologies may also be used for manufacturing the optical interconnect. If the waveguide channels are implemented in a single plane the following considerations are important:

(i) the bending of each optical communication channel must be limited because of the finite difference in refractive index between the core and the cladding of any optical waveguide. Guiding properties of a typical waveguide are based on the phenomenon of total internal reflection (complete reflection from the interface between two media having different refractive indices). A typical waveguide usually consists of a core with refractive index $n_1$, which is surrounded by a cladding with somewhat lower refractive index $n_2$. The simplest ray optics picture of a waveguide the angular range $\alpha$ of a guided mode propagation (due to the total internal reflection over the core-cladding interface) is given by Snell's law; $\sin \alpha_1/\sin \alpha_2 = n_2/n_1$, where $\alpha_1$ and $\alpha_2$ are the incidence angles in the respective medium. Thus, total internal reflection occurs when $\sin \alpha_1$ exceeds $n_2/n_1$ (since for the equation to hold, $\sin \alpha_2$ needs to be larger than 1). As a result, the bending angle of an optical waveguide can not surpass $\alpha$, where $\sin \alpha = n_2/n_1$;

(ii) if two optical communication channels cross their angle must be 90 degrees or within a predetermined deviation from 90°. Otherwise, the crosstalk between the involved channels will increase dramatically and will present a problem for quality of data transporting;

(iii) only two optical communication channels can cross at the same point. Otherwise the losses in each crossing channel and the crosstalk between the channels will be prohibitively large;

(iv) the distance between any two crossing points must not be too small because of the channel crosstalk issues, i.e., each crossing point gives rise to light scattering in the waveguides involved, and hence increased crosstalk between these waveguides; and (v) the distance between two optical communication channels (except at their crossing points) must not be too small because of the substantial width of the waveguide cladding, which with typical choice of currently available technologies, can be at least 50-75 μm wide due to a typically small difference between the refractive indices of the core and the cladding.

These constraints presented supra have been considered as basic for development of the layout of the optical waveguides in the optical communication fabric of the present invention.

Figure 5B:
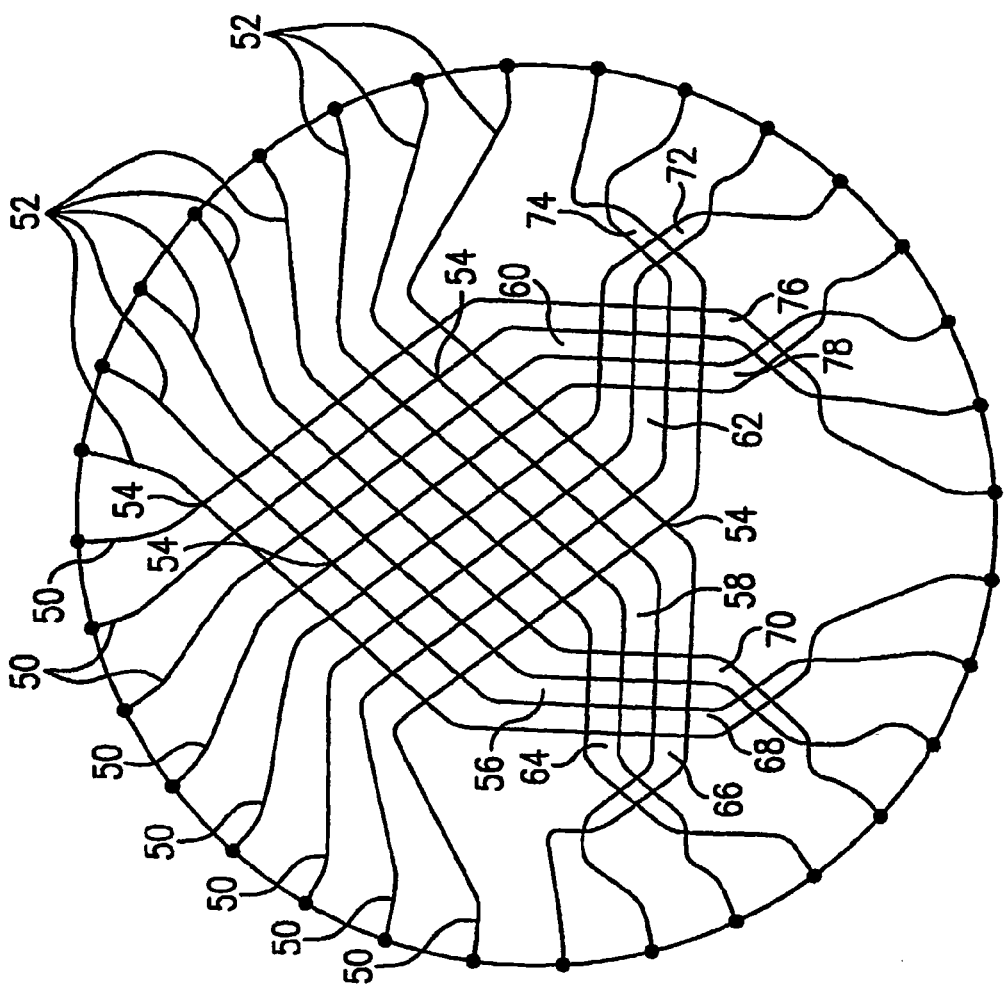
FIGS. 5A and 5B show respectively the central portion of FIG. 3A and an example of a layout of the optical communication channels.
Figure 5A:
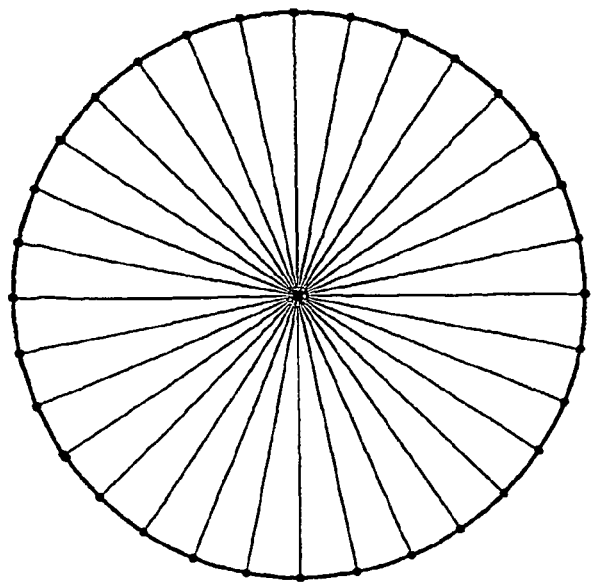
Figure 6A:
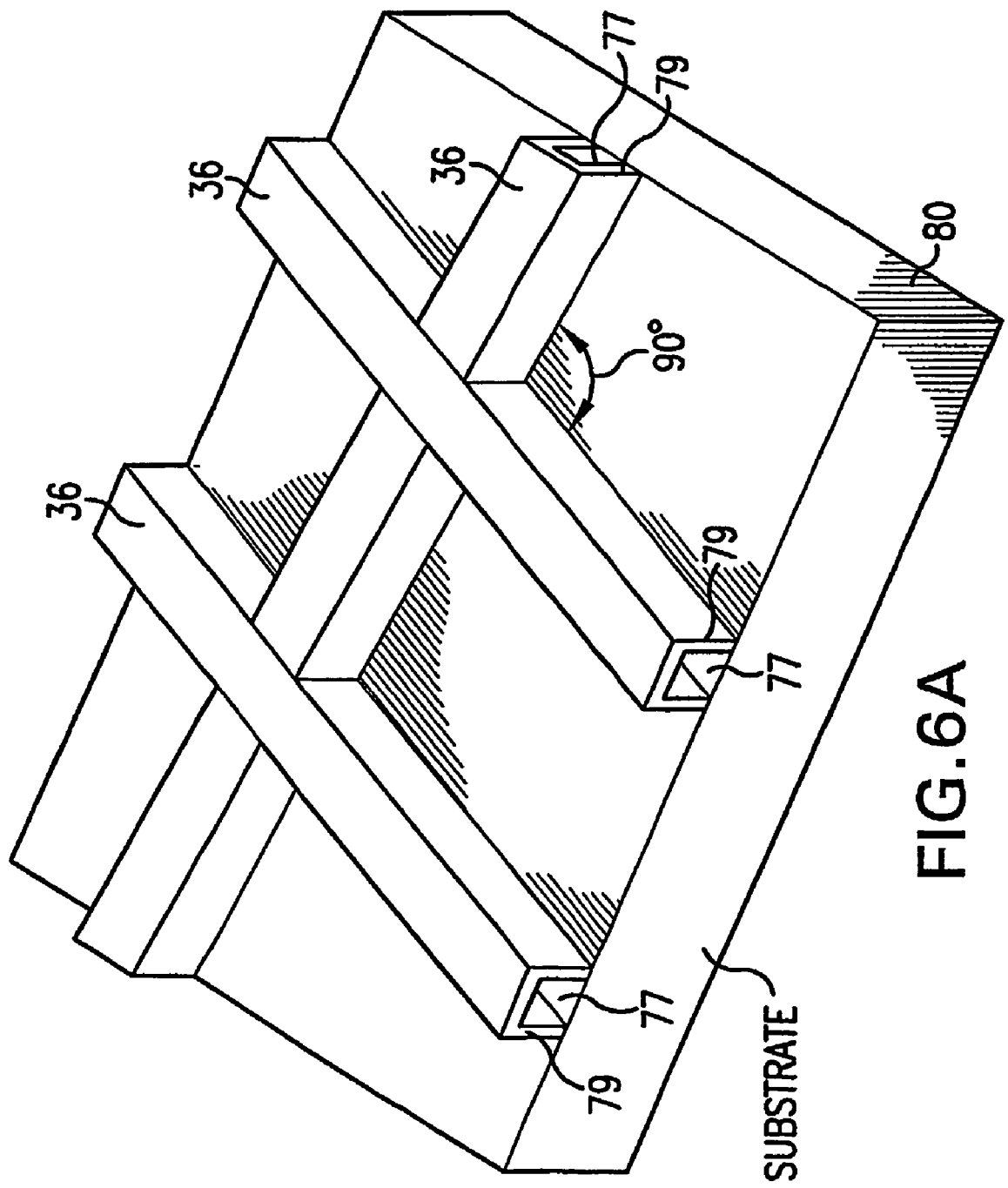
FIG. 6A shows a single-layer arrangement of the optical interconnect fabric of the present invention.
Figure 6B:
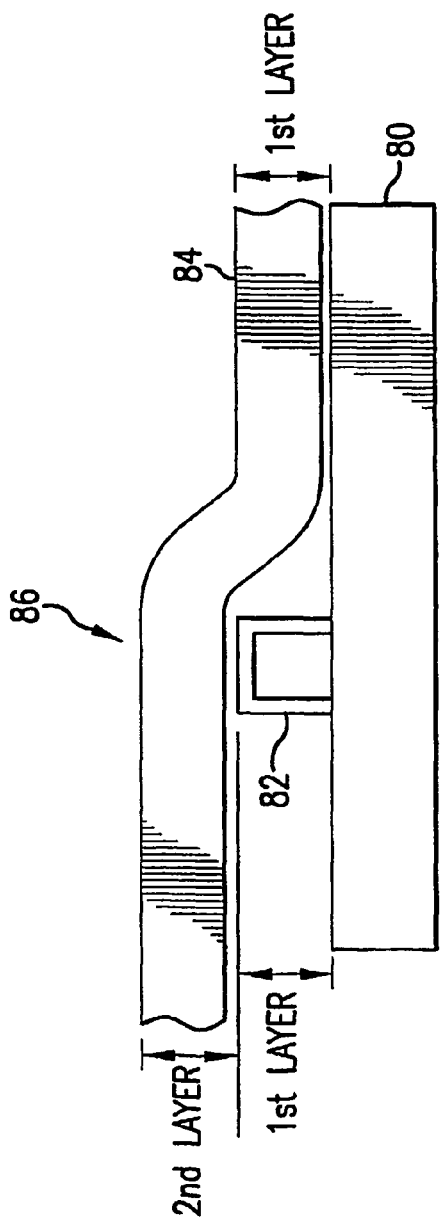
FIGS. 6B-6C show profiles of alternative double planes (bent-over) embodiments of the optical interconnect of the present invention.
Figure 6C:
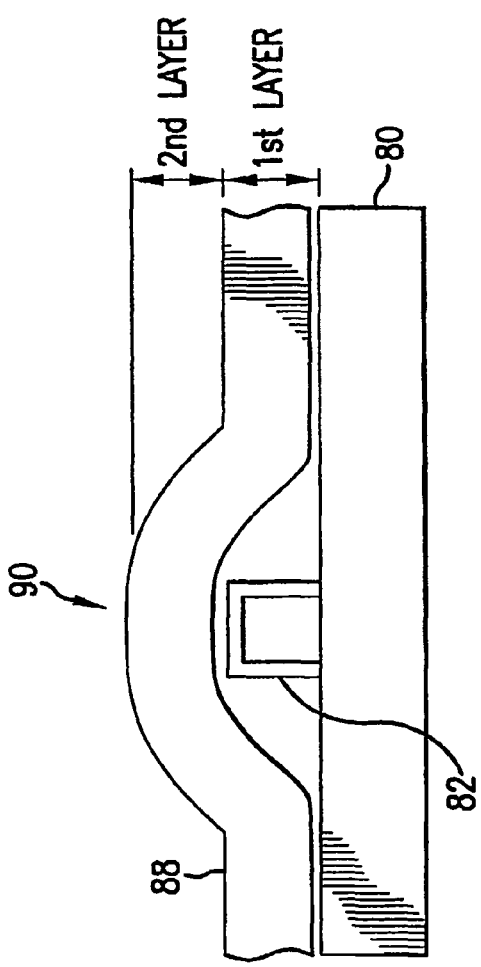

As a simplified approximation of a model of the optical communication structure, FIG. 3A depicts in a simplified form an all-to-all straight-line geometric interconnection among a plurality, for example, 32 processor-plus-memory modules in which 31 lines connect each module to the other modules. It should be understood that the arrangement having 32 chips interconnected by the optical interconnected fabric is chosen herein as one of examples of the application of the principles of the present invention, and is not to be considered as a limitation of the scope of the invention. One skilled in the art will readily appreciate that the teachings of the present invention will apply to any number of modules (16, 32, 64, . . . ) to be optically interconnected, and the number of optical communication channels, size of a wafer carrying the optical waveguides, as well as specific values of the bending, spacing of waveguides and distance between the waveguides is presented herein as one of a plurality of examples. FIGS. 5A and 5B depict a concept for turning the approximation of FIG. 3A into a one of examples of a real layout. The following parameters are assumed:

(i) the diameter of the interconnect 24 shown in FIG. 3A is 25 centimeters, which corresponds to a typical wafer size;

(ii) it is implemented as a single-layer waveguide, as shown in FIG. 6A. Although multilayer geometries are possible in principle, the fabrication issues can be much more complicated and expensive in a multilayer waveguide geometry. Nevertheless a double-layered structure is considered as an alternative embodiment of the interconnect fabric of the present invention as presented infra with respect to FIGS. 6B and 6C;

(iii) a waveguide does not have to be a straight-line, e.g., the waveguide may be bent, but to reduce radiation losses the bent part will at no point have a radius of curvature smaller than 50 micrometers, which is the typical width of the waveguide cladding;

(iv) two waveguides may cross in the plane, preferably in an orthogonal manner which drastically decreases the undesired coupling between the waveguides. One alternative approach is to bend a waveguide over the other to avoid crossing in the same plane as shown in FIGS. 6B and 6C. However, such out of plane bending may lead to much more complicated fabrication procedures and increased production costs;

(v) only two waveguides can cross at the same crossing point and the distance between two crossing points is at least 100 micrometer which is equal to two characteristic cladding widths; and (vi) the distance between two waveguides is never less than 100 micrometer except near their crossing point.

FIGS. 5A and 5B illustrate a way to satisfy all the constraints for 32 modules 22 for the point at the center (FIG. 5A) of FIG. 3A, where 16 lines meet, as well as for other areas of the optical interconnect fabric 24. FIG. 5B represents an example of how to bend the 8 lines 50 that come from the North-West quadrant in order that they run parallel to one another. The 8 lines 52 that come from the North-East quadrant also run parallel to one another. The 8 lines 50 form a grid with the lines 52 providing all the crossing points 54 between them where no two crossing points 54 are too close. The crossings within each group of 8 lines are obtained by recursively repeating a similar grid for each group. FIG. 5B depicts the crossings within the 2 groups of 8 lines 50 and 52 and then within the 4 groups 56, 58, 60, 62 of 4 lines and finally within the 8 groups 64, 66, 68, 70, 72, 74, 76, 78 of 2 lines.

FIGS. 3B-3E are provided to illustrate why the point at the center of FIG. 3A is most problematic, and why the situation elsewhere is much easier to handle. FIGS. 3B-3E were obtained by enlarging portions of FIG. 3A. Thus, FIG. 3B is a close-up of a portion of FIG. 3A. The enlargement is by a factor of 2 on the X axis and Y axis. The enlargement in FIG. 3C is by a factor of 4 relative to FIG. 3A on each axis. The enlargement in FIG. 3D is by a factor of 8 and the enlargement in FIG. 3E is by a factor of 16 relative to FIG. 3A. FIG. 3E shows that no more than 3 lines intersect at the same point. It also suggests that there is a sufficient space for combining ad-hoc bending of lines with the solution of FIG. 5B to satisfy all constraints.

In one implementation, the optical interconnect fabric 24 is a one layer structure where waveguides are crossing in the same plane. This is shown in FIG. 6A where the optical guides 36 which have a core 77 and a cladding 79, are formed on the same level on the substrate 80 and orthogonally intersect. An alternative two layer embodiment of the optical interconnect fabric, shown in FIG. 6B, is also envisioned as appropriate for the fabrication of the optical interconnect 24 of the present invention. In this case, two optical waveguides cross at the same X, Y coordinates but they have to be in different waves, e.g., having different Z coordinates. As illustrated in FIG. 6B, the waveguide 82 extends on one plane on the substrate 80 while the waveguide 84 extends partially on the same level with the waveguide 82, but has to bend over the waveguide 82 in order to advance from one layer to another.

Limited vertical bending of the waveguide 84 with the limited curvature radius at the "crossing" point 86 is permitted in the interconnect fabric of the present invention. Another preferred embodiment is illustrated in FIG. 6C, where the optical communication channels are all in the same layer (with the exception of the vicinity of a crossing point) and, near each crossing point one of the waveguides bends vertically into the other layer and then bends back into the first layer. Particularly, as shown in FIG. 6C, the waveguide 82 extends on the first level on the substrate 80 while the waveguide 88 first extends on the same level with the waveguide 82, then bends vertically over the waveguide 82 at the crossing point 90, and after the crossing point 90 bends back to return to the first layer on the substrate 80.

Several technologies are considered for fabrication of optical interconnect fabric 24 of the present invention. One of them is a waveguide technology, such as for example, $Si/SiO_2$ strip waveguide technology based on either a photolithographic patterning, lamination techniques, oxidation smoothing, anisotropic etching, laser direct patterning, as well as reactive ion etching, plasma enhanced chemical vapor deposition, etc. for creation of micro-optical waveguide structures. The materials used in fabrication of the optical interconnect fabric may include the silica-or-silicon, where Si can be used for substrate and as core material, while $SiO_2$ may be used as cladding material. Additionally polymer waveguides are considered as good candidates for the optical interconnect fabric of the present invention. These include optical polymers with low optical loss including Polyguide developed by DuPont, low loss polymers developed by Allied Signal and polyetherimid (ULTEM™) jointly developed by GE/Honeywell. These materials can be fabricated on a variety of substrates, have low optical losses, and can be subjected to photolithographic patterning, lamination techniques, laser machining, etc. to form mechanical structures (optical waveguides) with a high degree of accuracy and with excellent sidewall control. As one of excellent materials for cladding, the ULTEM™ combined with the benzocyclobutene (BCB) may be used if a core material is ULTEM™ as both these materials provide excellent temperature and mechanical stability and good optical transmission properties.

In addition to the above-referenced Si based waveguide technologies, gallium arsenide (GaAs) based technology is also considered for optical interconnect fabric of the present invention as best suited for fabrication of emitting devices and photodetectors. Presently silicon technology is the most convenient from the fabrication point of view, however silicon based lasers and photodetectors still require additional research. The optical interconnect fabric of the present invention may be fabricated using the silicon based waveguide technology for manufacturing waveguides and placing LEDs and photodetectors on a separate GaAs plane since III-V materials like gallium arsenide cannot be directly integrated with the silicon based devices.

As can be seen in FIGS. 3A-3E, as well as FIG. 5B, the optical waveguides intercross in a rather large number of crossing points, for example, for a 64 module interconnect, a waveguide may cross up to thousand other waveguides. This seems to allow a loss of no more than 0.1% per crossing assuming equal losses in each crossing point. Under such conditions, about 36% of the original optical power in an optical channel will reach the receiving end thereof which is generally sufficient for the channel operation. Such a low limit on the amount of channel crosstalk at a single intersection may require the use of somewhat more expensive out-of-plane bending, as presented in FIGS. 6B and 6C, in which the amount of crosstalk may be reduced.

The benefit of zero-crosstalk must be weighed against the cost of the optical interconnect structure. The cost for 16, 32, 64, etc. modules based on 0.25 micron technology is extremely inexpensive in comparison with 0.065 micron large computer chip. Therefore, the cost of the optical interconnect fabric 24, as well as the packaging costs involved, determine the overall price of the whole processor/memory package and this cost will determine whether a one layer (FIG. 6A) fabric waveguide structure is chosen, or whether a double layer structure (FIGS. 6B and 6C) is used.

Figure 7:
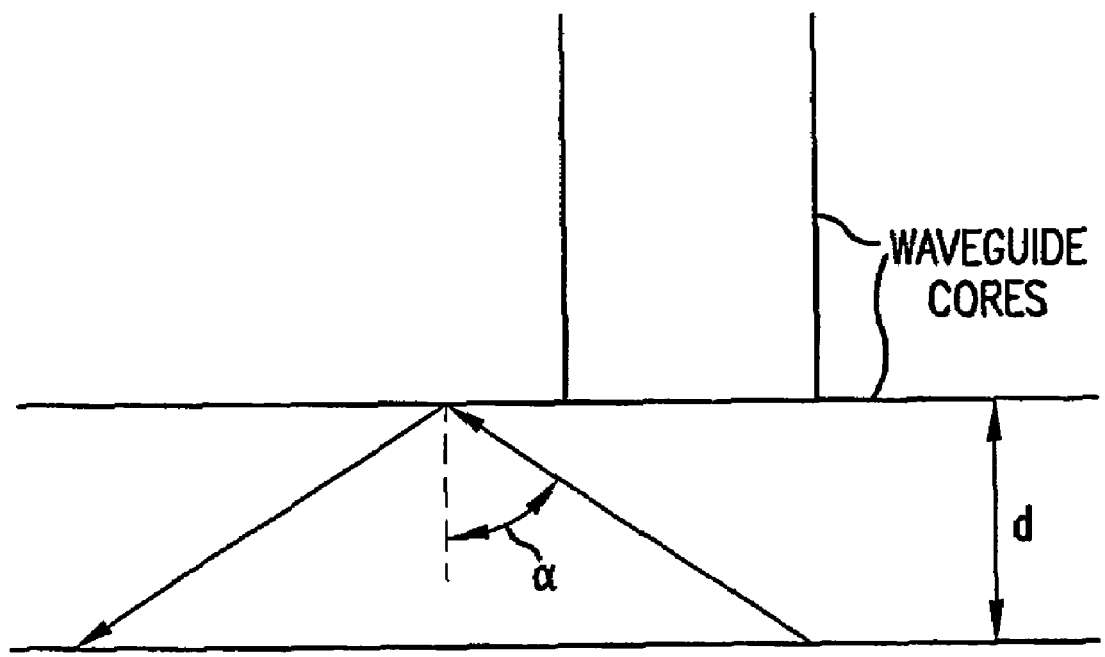
FIG. 7 schematically illustrates the principles of optical signal transmission over optical communication channels.

The proper combination of the materials of the core and the cladding of optical waveguides determines the amount of the radiative/scattering loss of the optical waveguide. FIG. 7 schematically illustrates how the optical wave propagates along the optical waveguide. From waveguide theory and the simple geometrical presentation shown in FIG. 7, it is clear that the scattered energy is proportional to $(n_2-n_1) \times$ (waveguide crossing area)/(core area affected by the crossing)$=(n_2-n_1)(\pi d^2/4)(2\pi d^2/\cos \alpha)=(n_2-n_1)\cos \alpha/8 \sim 3 \times 10^{-4}$, where $\alpha$ is the angular propagation range of a guided mode described above, d is the core diameter, and $(n_2-n_1) \sim 3 \times 10^{-2}$ is the characteristic refractive index difference between the core and the cladding, e.g., note that there will be no scattering if $(n_2-n_1)=0$. This estimate is below the maximum allowed limit. It may be further increased by the various imperfections of the crossing point. Thus, choosing a proper combination of core and cladding materials contributes in reducing the radiative/scattering loss at the crossing point between intersecting waveguides.

In addition to waveguide technology for fabricating the optical interconnect fabric, other technologies such as free space optics or fiber optics may be also alternative forms of implementation of the present invention. Free space optical interconnects work by point to point transmission of light signal via a system of lenses and/or mirrors. Such systems may have zero crosstalk between the communication channels and unlimited number of crossing points between the channels. Fiber optic systems in which individual fibers provide point to point connections have basically the same advantages. However, waveguide technology for fabrication of the optical interconnect of the present invention appears at the present time to have the potential to become the least expensive when compared with the free space optical interconnect and/or fiber optics interconnect for mass production, since it may lend itself to the low cost per unit fabrication model, where a relatively expensive mask is generated and used to produce many units.

Referring again to FIG. 4, at the coupling point between the ends of each optical communication channel 36 and the respective module 22 there is shown storage unit 92 for temporarily storing the data to be transmitted (at the sending end 46) or already transmitted (at the receiving end 48) prior to dumping this data into the module 22. The capacity of such a storage 92, as well as the capacity of the optical communication channel 36 itself, impacts the communication rate for each channel. As can be seen in FIG. 3A, a plurality of optical communication channels may have the same receiving end since they are connected to the same module. To facilitate transporting data to the same destination modem in a conflict-free fashion, there is provided in each such channel means 94 to communicate the size of the data to be transmitted to the common receiving end. Using special (electronic) hardware 96 at the destination modem 22, e.g., the prefix-sum hardware described in U.S. Pat. No. 6,542,918, future time slots are issued and sent back to the sending ends 46 for the transmission on each of the channels 36 having the common destination end. This arrangement guarantees a conflict-free access to the destination modem for a plurality of optical communication channels concurrently transporting data.

The motivation for the structure of the present invention has come from the area of parallel computing and in particular, from PRAM-On-Chip studies presented in "Explicit Multi-Threading (XMT): A Pram-On-Chip Vision", http://www.umiacs.umd.edu/users/vishkin/xmt/. Although massively parallel processors (MPPs) provide the strongest available machines, recent studies demonstrate that, due to their coarse-grain parallelism, MPPs have not been a success for some general purpose applications and in particular applications have irregular parallelism. Achieving programmable, high performance general-purpose parallel computing has been an objective of the explicit multi-threaded (XMT) fine grained parallel on-chip computer architecture framework. A substantial challenge for an XMT design is to provide connectivity between the many execution units and the many cache modules, on chip.

While the capacity for sensing signals increases with technology shrinkage, the latency for propagating signals down a fixed-length wire is increasing. Due to the memory module supported, memory requests can travel to any memory location on the chip. A latency cost for such memory access cannot be avoided. The "independence of order semantics (IOS)" of XMT threading permits such latency to be tolerated. (IOS does not inhibit progress irrespective of the order in which parallel memory requests are satisfied. Additionally, using high bandwidth interconnect to minimize memory stalls due to high latency is a known idea in parallel computing. This is key to understanding why the latency due to the distances in the presented optical interconnect do not inhibit high performance.

The supporting of simultaneous requests by pipelining throughout a powerful all electronic interconnection network overcomes two problems: (a) providing a centralized scheduling resource to coordinate communication would be costly for large design; and (b) driving a fast global clock across a deep sub-micron chip is also very difficult and power consumptive. The solution for this problem is to use a decentralized routing scheme, based on which the optical interconnect fabric of the present invention operates. The hardware costs of tagging and local switching structures on each of the modules 22 is justified by the benefits of such an asynchronous or loosely-synchronous structure as the present invention provides. The principles of the present invention are envisioned as applicable to an XMT architecture simulator.

The processor/memory arrangement of the present invention, which is envisioned as parallel computer system where optics is generally responsible for communication but where electronics continue to dominate processing, has been described in connection with specific forms and embodiments thereof. However, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A computer structure, including processing elements and memory elements, the computer structure comprising:
   a plurality of individual modules, each of said modules having said processing elements for processing data and at least one of said memory elements for storing data therein;
   an optical interconnect structure coupled to each of said plurality of modules for optically transporting data therebetween; wherein said optical interconnect structure includes a plurality of optical communication channels coupled to respective said modules to form an all-to-all interconnection therebetween; and
   a plurality of optoelectronic components, each of said plurality of optoelectronic components being coupled between an end of at least one respective optical communication channel and a respective one of said plurality of modules; wherein each of said plurality of optoelectronic components includes a light emitting diode coupled by an input thereof to an output port of said respective one of said plurality of modules for generating an optical signal corresponding to a digital signal output from said output port, said generated optical signal being optically coupled to a sending end of at least one respective optical communication channel for being transported therealong to an input port of at least one module of said plurality of the modules;
   wherein receiving ends of at least two of said plurality of optical communication channels are coupled to the same one of said plurality of modules, further comprising broadcasting means associated with a sending end of each of said at least two optical communication channels for broadcasting the size of the data to be transmitted to said receiving ends, over each of said at least two optical communication channels, and means associated with said receiving ends for issuing future time slots for data transmission on each of said at least two optical communication channels, and for sending said issued time slots to said sending ends of said at least two optical communication channels;
   wherein bending of each of said plurality of optical communication channels is limited by a predetermined radius of curvature;
   wherein crossing angle of two of said plurality of optical communication channels is 90° or within a predetermined deviation from 90°.

2. The computer structure of claim 1, wherein said memory elements of said plurality of the modules form a shared memory.

3. The computer structure of claim 2, wherein said memory elements on each of said plurality of modules comprises the highest level of the memory hierarchy.

4. The computer structure of claim 1, wherein said processing elements include parallel processing elements.

5. The computer structure of claim 1, wherein said optical communication channels include waveguide channels formed on a substrate.

6. The computer structure of claim 5, wherein said waveguide channels extend and intersect in a single plane.

7. The computer structure of claim 1, wherein said waveguide channels form a double plane waveguide and wherein at least one of said plurality of optical communication channels bends over at least another of said plurality of optical communication channels.

8. The computer structure of claim 1, wherein said optical communication channels of said interconnect structure include optical fibers.

9. The computer structure of claim 1, wherein each of said plurality of optoelectronic components includes a photodetector coupled by an input thereof to a receiving end of said at least one respective optical communication channel to receive an optical signal therefrom, said photodetector generating an electrical signal corresponding to said optical signal, said electrical signal being coupled to an input port of said respective module.

10. The computer structure of claim 1, wherein said plurality of optoelectronic components reside on said optical interconnect structure.

11. The computer structure of claim 1, further comprising storage elements associated with receiving and sending ends of said optical communication channels of said optical interconnect structure to temporarily store therein data.

12. The computer structure of claim 1, wherein receiving ends of a portion of said plurality of optical communication channels are coupled to the same destination one of said plurality of modules, further comprising means at said destination module for conflict-free access of data to said destination module.

13. The computer structure of claim 1, wherein the transport of the data in said optical interconnect structure is based on decentralized routing scheme.

14. The computer structure of claim 1, wherein said optical interconnect structure is pipelined.

15. The computer structure of claim 1, wherein one optical communication channel bends over another optical communication channel, thus avoiding crossing thereof in a single plane.

16. The computer structure of claim 1, wherein not more than two optical communication channels cross at the same crossing point.

17. The computer structure of claim 16, wherein a distance between two crossing points is below a predetermined value.

18. The computer structure of claim 16, wherein beyond said crossing point, a distance between two of said plurality of optical communication channels is below a predetermined spacing.

19. An interconnection fabric in a computer system for communication between a plurality of chips, wherein each chip includes processing elements and a memory element, said processing elements on said plurality of chips, in entirety thereof, forming the processing elements of the computer system, and said memory elements on said plurality of the chips, in entirety thereof, forming a shared memory in said computer system, the interconnect fabric comprising:
   a plurality of optical communication channels, each coupled between respective two of said plurality of chips to form an all-to-all interconnection therebetween to transport data in optical form thereof between said respective chips; wherein said plurality of optical communication channels is formed as a plurality of optical waveguides fabricated on a substrate;
   wherein at least one of said plurality of optical waveguides is bent; wherein the bending of said at least one optical waveguide is limited by a predetermined radius of curvature;
   wherein at least two of said plurality of said optical waveguides extend and intercross at a crossing point in a single plane on said substrate; and
   wherein the crossing angle of said at least two optical waveguides at said crossing point is 90° or within a predetermined deviation from 90°.

20. The interconnection fabric of claim 19, wherein said shared memory comprises a first-level cache and wherein said processing elements form the processing elements of a parallel computer system.

21. The interconnection fabric of claim 19, wherein at least one of said plurality of optical waveguides bends over at least another optical waveguide.

22. The interconnection fabric of claim 19, wherein not more than two optical waveguides of said plurality thereof cross at the same crossing point.

23. The interconnection fabric of claim 22, wherein a distance between two crossing points is above a predetermined value.

24. The interconnection fabric of claim 22, wherein beyond said crossing point, a distance between said at least two optical waveguide is above a predetermined spacing.

25. An optical interconnect structure in a computer system including a plurality of processing elements for processing data and a plurality of memory elements for storing data, the optical interconnect structure comprising:
- a plurality of optical communication channels, each channel having a sending end and a receiving end,
- wherein a bending of each of said plurality of optical communication channels is limited by a predetermined radius of curvature;
- wherein crossing angle of two of said plurality of optical communication channels crossing in the same plane is 90° or within a predetermined deviation from 90°;
- wherein maximum two optical communication channels cross in a single crossing point,
- wherein a distance between two crossing points is above a predetermined value, and
- wherein beyond the crossing point, a distance between two of said plurality of optical communication channels is above a predetermined spacing.

26. The optical interconnect structure of claim 25, wherein in said computer system said processing elements include parallel processing elements, and said memory elements form the highest level of the memory hierarchy.

27. The optical interconnect structure of claim 25, wherein said optical communication channels include waveguide channels formed on a substrate.

28. The optical interconnect structure of claim 27, wherein said waveguide channels extend and intersect in a single plane.

29. The optical interconnect structure of claim 27, wherein one of said waveguide channels bends over another of said waveguide channels.

30. The optical interconnect structure of claim 25, further comprising a plurality of optoelectronic components, each optically coupled to said receiving end of a respective at least one of said plurality of optical communication channels, said optoelectronic components connecting data received at said receiving ends from optical to electrical form thereof for coupling to respective of said processing elements or to respective of said memory elements.

31. The optical interconnect structure of claim 30, wherein each of said plurality of optoelectronic components includes a photodetector.

32. The optical interconnect structure of claim 25, further comprising a plurality of optoelectronic components, each optically coupled to said sending end of a respective at least one of said plurality of optical communication channels, said optoelectronic components converting data received at said sending ends from respective of said processing elements or respective of said memory elements from electrical form into optical form thereof.

33. The optical interconnect structure of claim 32, wherein each of said plurality of optoelectronic components includes a light emitting diode.

34. The optical interconnect structure of claim 25, wherein the transport of the data is based on decentralized routing scheme.

35. The optical interconnect structure of claim 25, wherein the transport of the data is based on pipeline scheme.

36. The optical interconnect structure of claim 25, wherein said plurality of memory elements includes the highest level of the memory hierarchy, said plurality of the processing elements and said plurality of memory elements being distributed over a plurality of chips, respectively, and said optical communication channels being coupled between respective said chips to form all-to-all interconnection therebetween.

37. The optical interconnect structure of claim 7, wherein processing of data is performed substantially in said processing elements.

38. The optical interconnect structure of claim 7, further comprising storage means associated with said sending and receiving ends of said plurality of optical communication channels for temporarily storing data therein.

39. The optical interconnect structure of claim 25, wherein at least a pair of said plurality of optical communication channels share a common receiving end or a common sending end.

40. A method for communicating data between processing elements of a processor and memory cells in a computer system, the method comprising the steps of:
- distributing said processing elements and said memory cells on a plurality of chips,
- interconnecting said plurality of chips by an optical interconnect structure, comprising a plurality of optical communication channels coupled between said chips to form an all-to-all interconnection therebetween,
- outputting processed or stored data, in electrical form thereof, at an output port of at least one chip,
- converting the data output at said output port of said at least one chip into optical form thereof,
- transporting said data, in the optical form thereof, over at least one of said plurality of optical communication channels to at least another of said plurality of chips,
- converting said transported data into electrical form, and
- coupling said data, in electrical form thereof, to an input port of said at least another of said plurality of chips for processing or storing said data therein.

41. The method of claim 40, further comprising the steps of:
- transporting the data over said plurality of optical communication channels in a pipelined regime.

42. The method of claim 40, further comprising the steps of:
- intersecting at least two of said plurality of optical communication channels in a single plane.

43. The method of claim 40, further comprising the steps of:
- bending at least one of said plurality of optical communication channels over at least another of said plurality of optical communication channel, the bending being limited by a predetermined radius of curvature.

44. The method of claim 40, further comprising the step of:
- temporarily storing the transported data in a storage unit associated with a receiving end of said at least one optical communication channel prior to submitting said data at said input port of said at least another chip.

45. The method of claim 40, further comprising the steps of:

broadcasting from a sending end of said at least one optical communication channel a size of data to be transported.

46. The method of claim 45, further comprising the step of: issuing time slots for said data transmission.

47. The method of claim 40, further comprising the step of: transporting the data over said plurality of optical communication channels in decentralized routing regime.

* * * * *